United States Patent [19]

Kato

[11] Patent Number: 4,901,170
[45] Date of Patent: Feb. 13, 1990

[54] ROTARY HEAD TYPE DIGITAL SIGNAL REPRODUCING METHOD

[75] Inventor: Takahiro Kato, Saitama, Japan

[73] Assignee: Pioneer Electronic Corporation, Tokyo, Japan

[21] Appl. No.: 195,971

[22] Filed: May 19, 1988

[30] Foreign Application Priority Data

Jun. 16, 1987 [JP] Japan .................. 62-148045

[51] Int. Cl.$^4$ ............................................. G11B 15/46
[52] U.S. Cl. .................................................. 360/73.07
[58] Field of Search ...................................... 360/73.07

[56] References Cited

U.S. PATENT DOCUMENTS 4,228,471 10/1980 Shiga ................................. 360/73.07
4,675,753 6/1987 Takayama et al. ............... 360/73.07

Primary Examiner—Robert S. Tupper
Attorney, Agent, or Firm—Sughrue, Mion, Zinn, Macpeak & Seas

[57] ABSTRACT

A method for playing a digitally recorded tape with a rotary head type reproduction apparatus in which selections which are recorded in unreproducible modes are automatically skipped. PCM-ID portions recorded in the PCM regions on the tape are detected to determine which regions on the tape are recorded in modes which are unreproducible by the particular reproduction apparatus. The detection operation may be performed during a rewinding operation. During the playing of the tape, the tape is quickly forwarded past selections which are found to be recorded in unreproducible modes. If no selections are found to be recorded in a reproducible mode, the tape cassette is automatically unloaded and ejected.

4 Claims, 1 Drawing Sheet

ROTARY HEAD TYPE DIGITAL SIGNAL REPRODUCING METHOD

BACKGROUND OF THE INVENTION

The present invention relates to a method for operating a magnetic recording and reproducing apparatus of the rotary head type, such as an R-DAT (rotary head type digital audio tape recorder). More particularly, the invention relates to a method for operating a rotary head type digital signal reproducing apparatus which is capable of reproducing programs recorded on a magnetic tape in different recording modes.

In an R-DAT, a magnetic tape is run at a predetermined speed around the periphery of a drum, at an angle of 90° relative to the rotational axis of the drum, while the drum is being rotated at a speed, for example, of 2,000 rpm. The program is recorded on the tape in the form of a plurality of parallel slanted tracks, adjacent ones of which are recorded and reproduced by two respective recording and reproducing heads mounted on a rotating drum. Each track includes, arranged in the direction in which the head rotates, a sub-code area, an ATF region, and a PCM region.

Three different tape running speeds are employed in present-day R-DATs, namely, an ordinary X1 speed of 8.150 mm/sec (normal speed mode), a X1.5 speed of 12.225 (wide track mode), and a X0.5 speed of 4.075 mm/sec (half speed mode). The wide track mode is employed to allow a contact printer to run at high speed, and the half speed mode is employed to provide the recorder with an extended playing time mode.

Moreover, different sampling frequencies are employed for the various modes, for example, 48, 44.1 and 32 kHz. Also, different numbers of quantization bits and different quantization techniques are sometimes used, namely, 16 bits in the case of linear quantization and 12 bits in the case of nonlinear quantization Even in the case of 12-bit quantization, different recording modes are often employed, for example, a long playing mode in which the tape speed is reduced by a factor of one-half and a four-channel mode in which the standard tape speed of 8.150 mm/sec is used and the number of channels is doubled.

Of course, not every R-DAT is capable of operating with all combinations of the parameters mentioned above. When it is attempted to play a tape having a selection previously recorded on another apparatus in a mode in which the present playing apparatus is not capable of operating, the result is either noise or a muted output. Thus, the user is forced to manually search the tape for a selection recorded in a mode in which his or her recorder is capable of operating.

SUMMARY OF THE INVENTION

Accordingly, it is an object of the present invention to provide an R-DAT in which the drawbacks discussed above have been eliminated.

In accordance with this and other objects of the present invention, there is provided a method for operating a digital recording and reproducing apparatus of the rotary head type in which only portions reproducible by the playing apparatus are reproduced, and the tape is forwarded at a high speed past unreproducible portions on the tape. When there is no reproducible portion on the tape, the tape is automatically unloaded and ejected.

More specifically, in accordance with the present invention, there is provided a method for operating a rotary head type digital signal reproducing apparatus in which PCM-ID portions recorded in the PCM region of the tape are detected and decoded to judge what portions recorded on the tape can be played by the apparatus at hand. For portions which the apparatus is incapable of playing, the tape is rapidly forwarded past those portions. If no reproducible portion is found on the tape, the tape is automatically ejected.

DESCRIPTION OF THE PREFERRED EMBODIMENTS

Preferred embodiments of the invention will now be described with reference to the attached drawings.

Figure 1:
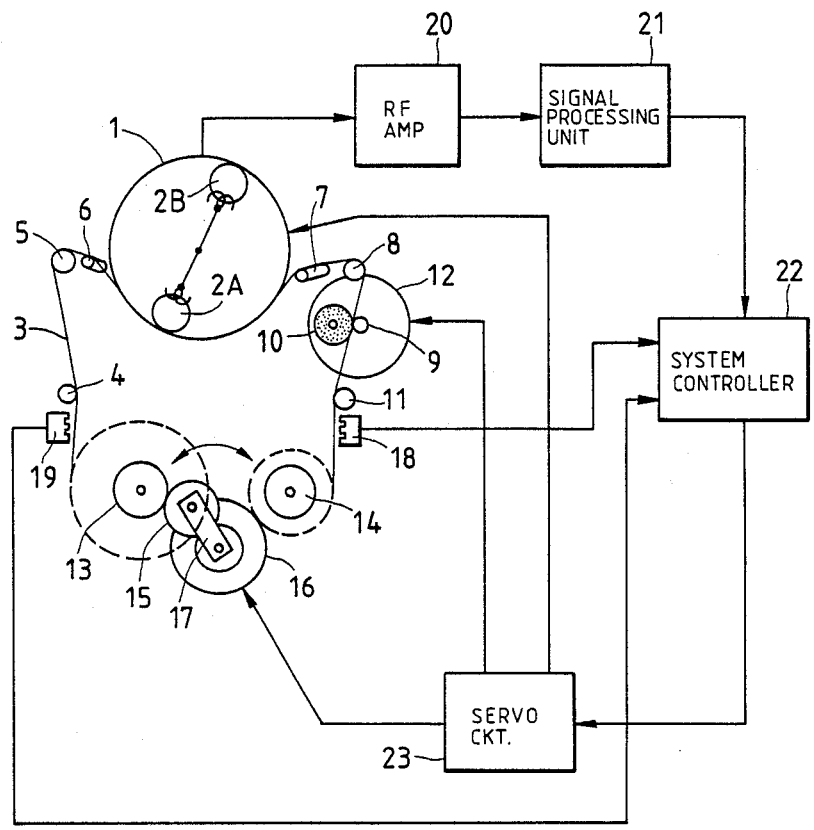
FIG. 1 of the attached drawings shows schematically a rotary head type digital signal reproducing apparatus constructed in accordance with the present invention.

With reference first to FIG. 1, a rotary drum 1 is rotationally driven at a speed of, for example, 2,000 rpm by a drum motor (not shown). On the rotary drum are mounted two heads 2A and 2B separated by a rotary angle of 180° and set so as to provide an azimuthal angle of 20°. Reference numeral 3 designates a magnetic tape, which is pulled out of a cassette by tape guides when the tape is loaded and laid around the periphery of the rotating drum 1 through an angle of 90° around the latter, thereby following a defined tape path or route. The tape path is formed by, from the tape supply reel, a supply side fixed post 4, an entrance side guide roller 5, an entrance side slanted post 6, the rotary drum 1, an exit side slanted post 7, an exit side guide roller 8, a capstan 9, a pinch roller 10, and a winding side post 11.

A tension post (not shown) for maintaining the tape tension on the rotary drum constant is provided between the fixed post 4 and the guide roller 5. The tension post is employed to control the supply reel according to the level of tape tension so as to maintain the tape tension at a constant level.

Reference numeral 12 indicates a capstan motor for driving the magnetic tape 3 at a predetermined speed. Further, reference numerals 13 and 14 designate, respectively, a supply side reel and a winding reel, 15 indicates an idler for transferring the rotary drive force of a reel motor 16 to the supply reel or the winding reel by means of a swinging arm 17, 18 is a leading end sensor for detecting the leading end of the tape, and 19 denotes a trailing end sensor for detecting the trailing end of the tape.

The sensors 18 and 19 can each be constituted, for example, by a LED and a phototransistor. The leading and trailing ends of the tape can be marked with transparent portions in the form of leader and trailer tapes. A prism or the like can in provided inside the tape cassette. A light beam is applied to the tape from the LED via the prism. For the transparent leader or trailer tape, a reflected beam will be incident upon the respective phototransistor, thereby indicating the presence of the start or finish of the tape. When the leading end sensor 18 generates an output, PLAY, FF, STOP and EJECT operations are carried out. When the trailing end sensor 19 generates an output, the only operation performed is a REW operation.

Further in FIG. 1, reference numeral 20 indicates an RF amplifier for amplifying the reproduced RF signal picked up from the recorded tape 3 by the heads 2A and 2B to a suitable level for subsequent processing. Reference numeral 21 denotes a signal processing unit for detecting a PCM-ID portion, which includes control information needed to control the reproduction of the various selections (songs, etc.) recorded on the tape 3, and which produces a reproducibility signal to indicate whether the various selections are recorded in such a manner as to be reproducible by the particular recorder.

Reference numeral 22 is a system controller for controlling the various operations of the system in response to the outputs of the sensors 18 and 19 and the reproducibility signal from the signal processing unit 21. Reference numeral 23 denotes a servo circuit for controlling the rates of rotation of the drum motor, the capstan motor 12 and the reel motor 16 in response to control signals from the system controller 22 in accordance with various running conditions of the tape 3.

The operation of this apparatus will now be described with reference to a case where the tape to be played has been recorded both with selections which can be reproduced by the apparatus and with selections which cannot be reproduced by the apparatus.

Figure 2:
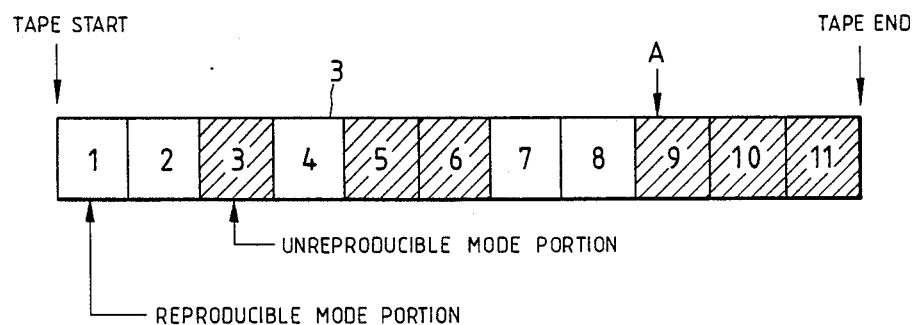
FIG. 2 is a diagram showing song numbers recorded on a magnetic tape in accordance with the present invention, including a reproducible portion and a unreproducible portion.

FIG. 2 indicates numbers of songs (selections) recorded on the tape, wherein hatching indicates songs which cannot be reproduced by the present apparatus, while the remaining songs (unhatched) are reproducible by the apparatus.

After the cassette containing the tape is loaded into the apparatus and playing started, the reproduced RF signal picked up from the tape by the heads 2A and 2B is supplied to the signal processing unit 21 through the RF amplifier 20. The PCM-ID portion recorded on the tape is detected by the signal processing unit 21, and a reproducibility indicating signal is produced in response to decoded PCM-ID portion. For example, when a song is found to be recorded in a reproducible mode, a signal at an "H" level is supplied to the system controller 22, while when a song is not reproducible, the signal is at the "L" level.

For this purpose, the PCM-ID portion contains data indicating the existence and type of emphasis, the sampling frequency, the number of channels in which the song is recorded, the quantization bit number, the track width (13.6 μm in the standard mode, 20.4 μm for a prerecorded tape), whether or not the song can be digitally copied, and a control signal for reproducing the PCM data, such as a signal indicating the PACK structure. These data are decoded by the signal processing unit 21 in order to judge whether or not each song can be reproduced by the apparatus.

When it is determined that a song can be reproduced and an "H" level signal is supplied to the system controller 22 by the signal processing unit 21, the system controller 22 supplies a control signal indicating the ordinary reproduction mode to the servo circuit 23 to cause the latter to control the drum motor, capstan motor 12, reel motor 16, etc., in such a manner as to carry out an ordinary reproduction operation.

On the other hand, when the signal processing unit 21 judges that a song is recorded in an unreproducible mode and hence an "L" level signal is supplied to the system controller 22, the system controller 22 supplies a control signal to the servo circuit 23 to cause the latter to drive the drum motor, reel motor 16, etc., so as to carry out a fast forwarding operation. During the fast forwarding operation, the signal processing section detects the PCM-ID portion of the subsequent song. If a judgement is made that the song is reproducible, reproduction is again carried out in the ordinary manner.

As described above, when an unreproducible song is detected, the tape 3 is automatically run in the fast forward mode and the tape forwarded to the beginning of the next song recorded on the tape where the PCM-ID of that song is recorded. If the decoding of the PCM-ID of the song indicates that the song can be reproduced, ordinary reproduction is commenced, whereas if the decoding of the PCM-ID indicates that the song cannot be reproduced, fast forwarding to the next subsequent song is carried out and the process repeated. In this manner, for the example of FIG. 2, songs will be reproduced in the order of $1 \to 2 \to 4 \to 7 \to 8$. Because fast forwarding is carried out for songs recorded in unreproducible modes, the reproduction of reproducible songs is carried out in a normal and efficient manner.

The case where reproduction is carried out from the position A indicated in FIG. 2 will now be described.

In the example illustrated in FIG. 2, songs numbers 9, 10 and 11 are recorded in unreproducible modes. Hence, when reproduction is commenced from position A, a reproducibility signal at the "L" level, indicating that the song is recorded in an unreproducible mode, is supplied from the signal processing unit 21 to the system controller 22. In response, the system controller 22 causes the magnetic tape 3 to be run at a high speed to the end of the tape, as described above. When all of the tape has been wound on the take-up reel, reaching the trailing end of the tape, a trailing end detection signal is supplied from the trailing end sensor 19 to the system controller 22.

Upon receipt of the tape end detection signal, the system controller 22 supplies a control signal to the servo circuit 23 to instruct the latter to control the drum motor and reel motor 16 so as to rewind the tape. Thus, the rotational force of the reel motor 16 is transferred by the contact of an idler 15 with a supply side reel 13 through a swing arm 17, rewinding the tape 3 to its start position.

During the rewinding of the tape to the starting position, a flag indicating that a reproducible mode portion has been detected is set in response to the detection of the PCM-ID portion by the signal processing unit 21. When the leading end of the tape is reached, a tape leading end detection signal is supplied from the leading end sensor 18 to the system controller 22. The system controller then instructs control of the magnetic tape 3 so as to cause it to be fed at fast speed to the start of the first reproducible song, as indicated by the flag set during the rewinding operation.

When reproduction is started from position A indicated in FIG. 2, the portion of the tape from song number 9 to the end of the tape is passed using a fast forwarding operation. Further, the reproducibility of the various songs recorded on the tape is detected during the rewinding operation. As a result, fast feeding of the tape can be carried out after the tape has been rewound, and without delay playing is carried out for the songs recorded in reproducible modes in the order of $1 \to 2 \to 4 \to 7 \to 8$.

If the signal processing unit 21 fails to detect any songs recorded in a reproducible mode during the rewinding operation, when the sensor 18 issues a leading end detection signal to the system controller 22, a control signal indicating a stalled condition is supplied to the servo circuit 23, causing the latter to unload and eject the tape cassette at the end of the rewinding operation.

In accordance with the present invention described in detail above, by detecting the PCM-ID portions recorded in the PCM regions on the tape being played and by decoding the data contained in the PCM-ID portions, it is judged whether or not the various songs recorded on the tape are recorded in reproducible modes. Subsequently, only songs recorded in reproducible modes are played with the tape being fast forwarded past songs which are recorded in unreproducible modes. When no song is found on the tape which is recorded in a reproducible mode, the tape is automatically unloaded and ejected from the apparatus.

What is claimed is:

1. A method for reproducing a digitally recorded tape with a rotary head reproducing apparatus, comprising the steps of:

automatically detecting selections recorded on said tape recorded in an unreproducible mode; and automatically fast forwarding said tape in a forward direction past ones of said selections found recorded in said unreproducible mode, wherein said step of automatically detecting selections recorded in said unreproducible mode comprises detecting PCM-ID portions recorded and comparing said decoded data with the reproducing capabilities of the reproducing apparatus mode.

2. The method of claim 1, further comprising a step of automatically rewinding said tape after said tape has wound in the forward direction, said step of automatically detecting selections recorded in said unreproducible mode being automatically performed during said rewinding of said tape.

3. The method of claim 2, further comprising the steps of automatically detecting a leading end of said tape during said rewinding step, automatically fast forwarding said tape to a start position of a first selection detected as being recorded in a reproducible mode during said automatic rewinding step, and automatically commencing playing of said tape at said start position of said first selection found to be recorded in a reproducible mode.

4. The method of claim 1, further comprising the steps of automatically detecting when no selection is recorded on said tape in a reproducible mode during said rewinding step, and subsequently, automatically unloading and ejecting said tape when no selection is detected which is recorded in a reproducible mode.

* * * * *